Feb. 28, 1928.  1,660,817
G. W. PRINCE ET AL
APPARATUS FOR AND METHOD OF TREATING COPPER ORES
Filed Jan. 13, 1926

INVENTORS
George W Prince and
Joseph H English
BY
ATTORNEYS

Patented Feb. 28, 1928.

1,660,817

UNITED STATES PATENT OFFICE.

GEORGE W. PRINCE AND JOSEPH H. ENGLISH, OF CLEMENCEAU, ARIZONA, ASSIGNORS TO UNITED VERDE EXTENSION MINING COMPANY, OF NEW YORK, N. Y., A CORPORATION OF DELAWARE.

APPARATUS FOR AND METHOD OF TREATING COPPER ORES.

Application filed January 13, 1926. Serial No. 80,966.

Heretofore where non-sulphide or oxidized copper ores have been leached and electrolytically precipitated, the ore pulp was leached in one tank and the solution was then conveyed to another tank where the copper was electrolytically precipitated. This treatment is very expensive and slow, requiring enormous amounts of water and costly re-agents and involving large copper losses.

The object of this invention is to materially simplify the apparatus and reduce the operating costs and time of treatment, by subjecting the ore to leaching and electrolysis in the same chamber and at the same time, preferably utilizing waste sulphur dioxide gas drawn from the ore roasting furnace for agitating and leaching the ore pulp; the electrolytic unit in said chamber acting to precipitate electrolytically the copper as fast as it goes into solution.

In the accompanying drawings.

Figure 1:
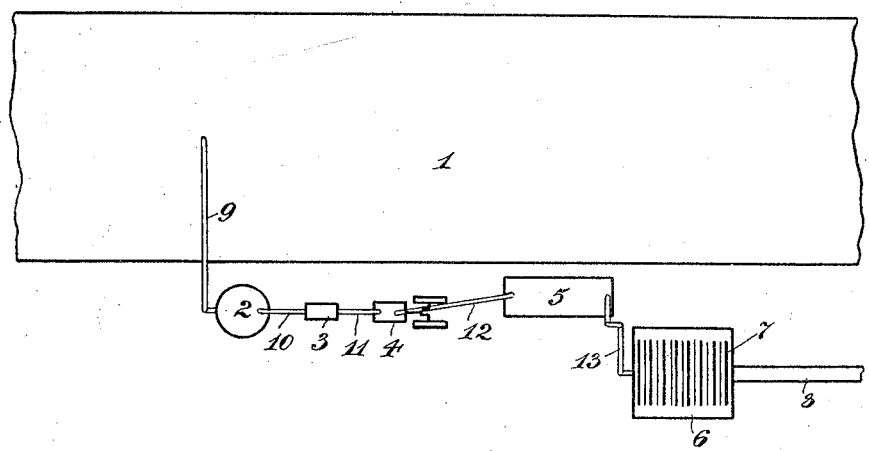
Fig. 1 represents diagrammatically in plan an apparatus suitable for carrying out the process.
Figure 2:
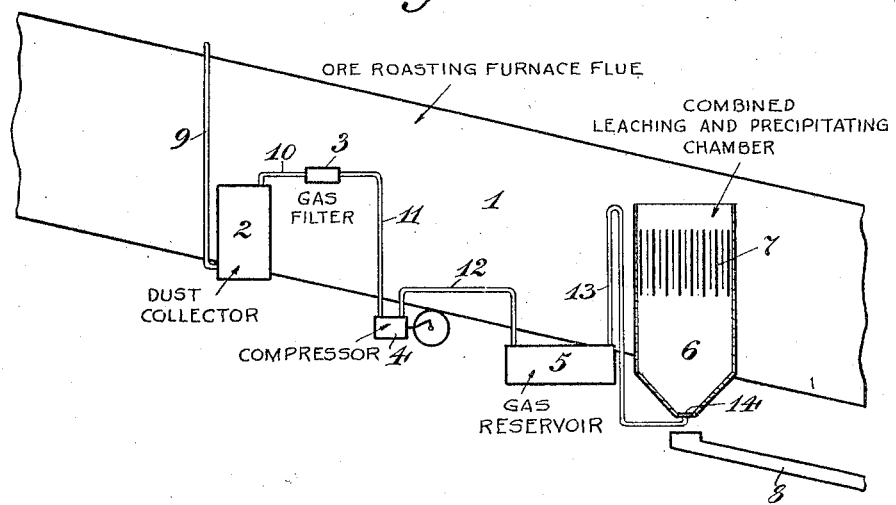
Fig. 2 represents the apparatus diagrammatically in side elevation, the common chamber in which the ore is leached and electrolytically precipitated being shown in section.

The ore roasting furnace flue is denoted by 1, the dust collector by 2, the gas filter by 3, the compressor by 4, the gas reservoir by 5, the tank having the combined leaching and precipitating chamber by 6, the electrolytic unit in said chamber by 7 and the residue discharge trough by 8. Pipes 9, 10, 11, 12 and 13 respectively lead from the ore roasting furnace flue to the dust collector, from the dust collector to the filter, from the filter to the compressor, from the compressor to the gas reservoir and from the gas reservoir to the bottom of the combined leaching and precipitating chamber. A suitable gate 14 is provided at the bottom of the chamber for permitting the residue to be discharged into the trough 8.

The process is carried out as follows:

The chamber in the tank 6 is charged in any well known or approved way with a suitable mixture of finely ground ore and water, within which chamber there is located the electrolytic unit 7. Waste sulphur dioxide gas is drawn from the ore roasting furnace flue 1 by the compressor 4 through the dust collector 2 and gas filter 3 and forced into the reservoir 5, from which it is forced into the bottom of the chamber 6 where it passes upwardly through the ore pulp to violently agitate and leach the same.

As fast as the copper goes into solution, it is precipitated on to the cathodes of the electrolytic unit 7, to be removed therefrom when the required amount of copper deposit has been obtained. After the copper has been removed from the solution, the residue is discarded by opening the gate 14 in the bottom of the tank to permit the discharge of the residue into the trough 8.

By forcing the sulphur dioxide gas upwardly through the mixture of ore and water in the common leaching and electrolytic precipitating chamber, a sufficiently violent agitation of the pulp is obtained to not only expedite the solution of the copper minerals by the sulphurous acid formed, but also oxidizes the same from sulphite to sulphate, due to the large excess of air in the chamber. It also permits the application of a higher current density than could otherwise be employed and yet obtains a firm deposit of the copper in the electrolytic unit. Furthermore, by this process a complete extraction of the copper and electrolytic precipitation of nearly pure cathode copper is obtained in a considerably shorter time than heretofore by the methods commonly employed and at a much less operating expense because of the simple apparatus required and by using the waste sulphur dioxide gas drawn from the ore roasting furnace instead of being compelled to use sulphuric acid or other expensive re-agents. Also, copper losses are materially cut down, by obviating the necessity of using wash water, doing away with the dilute solutions and the enormous quantities of water heretofore used in leaching processes.

What we claim is:—

1. An apparatus for the treatment of copper ores comprising a tank having a chamber for containing the ore pulp, means for forcing sulphur dioxide gas into the chamber to violently agitate and leach the pulp and an electrolytic unit located in said chamber for precipitating the copper as fast as it goes into solution.

2. An apparatus for the treatment of copper ores comprising a tank having a chamber for containing the ore pulp, means for forcing sulphur dioxide gas into the chamber to violently agitate and leach the pulp, an electrolytic unit located in said chamber for precipitating the copper as fast as it goes into solution, and means for discharging the residue from the chamber after the copper has been removed therefrom.

3. An apparatus for the treatment of ores comprising a tank having a chamber for containing the ore pulp, means for drawing waste sulphur dioxide gas from an ore roasting furnace and forcing the gas into the chamber and upwardly through said pulp to violently agitate and leach it, and an electrolytic unit located in said chamber for precipitating the copper as fast as it goes into solution.

4. An apparatus for the treatment of copper ores comprising a tank having a chamber for containing the ore pulp, means for drawing waste sulphur dioxide gas from an ore roasting furnace, removing the dust from the gas and forcing the gas into the chamber and upwardly through said pulp to violently agitate and leach it, and an electrolytic unit located in said chamber for precipitating the copper as fast as it goes into solution.

5. An apparatus for the treatment of copper ores comprising a tank having a common leaching and precipitating chamber for containing the ore pulp, means for drawing waste sulphur dioxide gas from an ore roasting furnace and forcing it into the chamber to violently agitate and leach the pulp, said means including a dust collector, a filter, a compressor and a gas reservoir, and an electrolytic unit located in said chamber for precipitating the copper as fast as it goes into solution.

6. The method of treating copper ores which consists in subjecting a mixture of finely ground ore and water to the action of sulphur dioxide gas in the presence of an electrolytic unit to leach the mixture and precipitate the copper electrolytically as fast as it goes into solution.

7. The method of treating copper ores which consists in forcing sulphur dioxide gas into a chamber containing an electrolytic unit and a mixture of finely ground ore and water to violently agitate and leach the mixture and precipitate the copper electrolytically as fast as it goes into solution.

In testimony, that we claim the foregoing as our joint invention, we have signed our names this second day of January, 1926, and this second day of January, 1926.

GEORGE W. PRINCE.
JOSEPH H. ENGLISH.